(12) United States Patent
Kravets et al.

(10) Patent No.: US 11,113,497 B2
(45) Date of Patent: Sep. 7, 2021

(54) MULTIPHASE FINGERPRINT SENSOR LAYOUT AND CONSTRUCTION

(71) Applicant: Cypress Semiconductor Corporation, San Jose, CA (US)

(72) Inventors: Igor Kravets, Lviv (UA); Oleksandr Hoshtanar, Lviv (UA); Hans Klein, Pleasanton, CA (US); Oleksandr Karpin, Lviv (UA)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 16/017,513

(22) Filed: Jun. 25, 2018

(65) Prior Publication Data

US 2019/0005293 A1    Jan. 3, 2019

Related U.S. Application Data

(63) Continuation of application No. 14/964,562, filed on Dec. 9, 2015, now Pat. No. 10,013,593.

(60) Provisional application No. 62/216,253, filed on Sep. 9, 2015, provisional application No. 62/216,263, filed on Sep. 9, 2015.

(51) Int. Cl.
    *G06F 3/044*    (2006.01)
    *G06K 9/00*    (2006.01)
    *G06F 3/041*    (2006.01)

(52) U.S. Cl.
    CPC .......... *G06K 9/0002* (2013.01); *G06F 3/044* (2013.01); *G06F 3/0418* (2013.01)

(58) Field of Classification Search
    CPC ............... G06K 9/00013; G06K 9/002; G06K 9/00033; G06F 3/041; G06F 3/0416; G06F 3/044
    See application file for complete search history.

(56) References Cited

U.S. PATENT DOCUMENTS

| 6,108,438 A | 8/2000 | Bird et al. |
| 7,460,697 B2 | 12/2008 | Erhart et al. |
| 7,735,721 B1 | 6/2010 | Ma et al. |

(Continued)

FOREIGN PATENT DOCUMENTS

WO    2014021918 A1    2/2014

OTHER PUBLICATIONS

SIPO Office Action for Application No. 201680047791.0 dated Nov. 5, 2018; 5 pages.

(Continued)

*Primary Examiner* — Dennis P Joseph

(57) ABSTRACT

A capacitive fingerprint sensor includes a set of capacitive sensor electrodes in a sensing area. The set of capacitive sensor electrodes includes a set of transmit (Tx) sensor electrodes, a set of receive (Rx) sensor electrodes, and a set of compensation electrodes. The fingerprint sensor also includes a multiphase capacitance sensor that is configured to perform a sensing scan of the capacitive sensor electrodes by applying a first Tx signal to a first subset of the Tx sensor electrodes while simultaneously applying a second Tx signal to a second subset of the set of Tx sensor electrodes, and based on a compensation signal received at the set of compensation electrodes, reduce a component of the Rx signal originating from a source other than a contact at the sensing area.

20 Claims, 12 Drawing Sheets

(56) References Cited

U.S. PATENT DOCUMENTS

| | | |
|---|---|---|
| 8,115,497 B2 | 2/2012 | Gozzini |
| 8,736,577 B2 | 5/2014 | Land et al. |
| 8,786,295 B2 | 7/2014 | Chandra et al. |
| 8,874,396 B1 | 10/2014 | Olson et al. |
| 8,890,547 B2 | 11/2014 | Maharyta et al. |
| 8,952,916 B2 | 2/2015 | Reynolds |
| 9,013,441 B2 | 4/2015 | Kremin et al. |
| 9,019,220 B1 | 4/2015 | Klein et al. |
| 2003/0035570 A1 | 2/2003 | Benkley |
| 2003/0035572 A1 | 2/2003 | Kalnitsky et al. |
| 2007/0031011 A1 | 2/2007 | Erhart et al. |
| 2011/0216033 A1 | 9/2011 | Mamba et al. |
| 2012/0162094 A1 | 6/2012 | Kent et al. |
| 2012/0200524 A1 | 8/2012 | Vallis et al. |
| 2012/0256869 A1 | 10/2012 | Walsh et al. |
| 2012/0268142 A1 | 10/2012 | Kremin et al. |
| 2013/0009651 A1 | 1/2013 | Benkley |
| 2013/0009905 A1 | 1/2013 | Castillo et al. |
| 2013/0021294 A1 | 1/2013 | Maharyta et al. |
| 2013/0221993 A1 | 8/2013 | Ksondzyk et al. |
| 2014/0085252 A1 | 3/2014 | Hanssen et al. |
| 2015/0022670 A1 | 1/2015 | Gozzini et al. |
| 2015/0185913 A1 | 7/2015 | Han et al. |
| 2015/0242672 A1 | 8/2015 | Benkley et al. |
| 2015/0268783 A1* | 9/2015 | Yoon .................. G06F 3/0414 345/173 |
| 2015/0277655 A1 | 10/2015 | Kim |
| 2016/0364593 A1 | 12/2016 | Lee et al. |

OTHER PUBLICATIONS

USPTO Notice of Allowance for U.S. Appl. No. 14/978,442 dated Apr. 3, 2019; 16 pages.
USPTO Appeal Board Decision on Appeal for U.S. Appl. No. 14/978,442 dated Jan. 25, 2019; 10 pages.
Davison, Burk, "Techniques for Robust Touch Sensing Design," dated Nov. 29, 2012, 30 pages.
International Search Report for International Application No. PCT/US2016/034162 dated Jul. 29, 2016; 2 pages.
International Search Report for International Application No. PCT/US2016/050186 dated Sep. 27, 2016; 4 pages.
Mohamed Gamal, et al., "Concurrent Driving Method with Fast Scan Rate for Large Mutual Capacitance Touch Screens," Journal of Sensors, Apr. 2014, 7 pages.
Shruti H, et al. "Designing a Capacitive Sensing System for a Specific Application," Dec. 2011, 14 pages, Cypress Semiconductor Corporation, EE Times.
Srinivasagam, Kannan, et al., "Differentiating Noise from Real Touch—The Key to Robust Capacitive Sensing," Oct. 2010, 8 pages, Cypress Semiconductor Corporation, EE Times Design.
USPTO Advisory Action for U.S. Appl. No. 14/978,442 dated Mar. 20, 2017; 3 pages.
USPTO Advisory Action for U.S. Appl. No. 14/964,562 dated Apr. 10, 2017; 4 pages.
USPTO Advisory Action for U.S. Appl. No. 14/964,562 dated Aug. 2, 2016; 3 pages.
USPTO Advisory Action for U.S. Appl. No. 14/964,562 dated Oct. 23, 2017; 3 pages.
USPTO Applicant Initiated Interview Summary for U.S. Appl. No. 14/964,562 dated Apr. 5, 2017; 3 pages.
USPTO Applicant Initiated Interview Summary for U.S. Appl. No. 14/964,562 dated Jul. 20, 2017; 3 pages.
USPTO Applicant Initiated Interview Summary for U.S. Appl. No. 14/964,562 dated Oct. 16, 2017; 3 pages.
USPTO Examiners Answer to Appeal Brief for U.S. Appl. No. 14/978,442 dated Feb. 7, 2018; 9 pages.
USPTO Final Rejection for U.S. Appl. No. 14/964,562 dated Feb. 2, 2017; 35 pages.
USPTO Final Rejection for U.S. Appl. No. 14/964,562 dated Jun. 2, 2016; 26 pages.
USPTO Final Rejection for U.S. Appl. No. 14/964,562 dated Aug. 17, 2017; 28 pages.
USPTO Final Rejection for U.S. Appl. No. 14/978,442 dated Dec. 20, 2016; 17 pages.
USPTO Non-Final Rejection for U.S. Appl. No. 14/964,562 dated Apr. 8, 2016; 23 pages.
USPTO Non-Final Rejection for U.S. Appl. No. 14/964,562 dated May 23, 2017; 36 pages.
USPTO Non-Final Rejection for U.S. Appl. No. 14/964,562 dated Sep. 26, 2016; 33 pages.
USPTO Non-Final Rejection for U.S. Appl. No. 14/978,442 dated Sep. 8, 2016; 15 pages.
USPTO Notice of Allowance for U.S. Appl. No. 14/964,562 dated Mar. 13, 2018; 8 pages.
USPTO Notice of Allowance for U.S. Appl. No. 14/964,562 dated Dec. 5, 2017; 7 pages.
USPTO Requirement for Restriction Election for U.S. Appl. No. 14/978,442 dated Apr. 4, 2016; 6 pages.
Written Opinion of the International Searching Authority for International Application No. PCT/US2016/034162 dated Jul. 29, 2016; 9 pages.
Written Opinion of the International Searching Authority for International Application No. PCT/US2016/05186 dated Sep. 27, 2016; 6 pages.
USPTO Non-Final Rejection for U.S. Appl. No. 16/507,344 dated Jun. 23, 2020; 14 pages.

* cited by examiner

MULTIPHASE FINGERPRINT SENSOR LAYOUT AND CONSTRUCTION

RELATED APPLICATIONS

This application is a Continuation Application of U.S. patent application Ser. No. 14/964,562, filed Dec. 9, 2015, which claims priority to U.S. Provisional Application No. 62/216,263, filed on Sep. 9, 2015, and to U.S. Provisional Application No. 62/216,253, filed on Sep. 9, 2015, all of which are incorporated by reference herein in their entirety.

TECHNICAL FIELD

This disclosure relates to the field of fingerprint sensors and, in particular, to capacitive fingerprint sensor arrays.

BACKGROUND

Capacitance sensing systems function by sensing electrical signals generated on electrodes that reflect changes in capacitance. Such changes in capacitance can indicate a touch event or the presence of ridges and valleys of a fingerprint. Fingerprint sensing may be used for security and validation applications for a variety of user interface devices, such as mobile handsets, personal computers, and tablets. The use of capacitance sensing for fingerprint detection may allow for a sensor to be placed in the surface of a user interface device with a great degree of configurability. That is, a sensor is not constrained to a single location for all devices. Rather, a fingerprint sensor may be disposed in a location on the device that is convenient for a particular industrial design, or to optimize a user's experience.

Capacitance-based fingerprint sensors function by measuring the capacitance of a capacitive sense element, such as a sensor electrode, and detecting a change in capacitance indicating a presence or absence of a fingerprint ridge (or valley). Ridges and valleys at identifiable locations on an array of sense elements may be used to reconstruct the image of the fingerprint for use in enrollment, validation, and security applications. When a fingerprint ridge comes into contact with or is in close proximity to a sense element, the capacitance change caused by the fingerprint ridge is detected. The capacitance change of the sense elements can be measured by an electrical circuit that converts the capacitances measured from the capacitive sense elements into digital values.

BRIEF DESCRIPTION OF THE DRAWINGS

The present disclosure is illustrated by way of example, and not by way of limitation, in the figures of the accompanying drawings.

DETAILED DESCRIPTION

Figure 1:
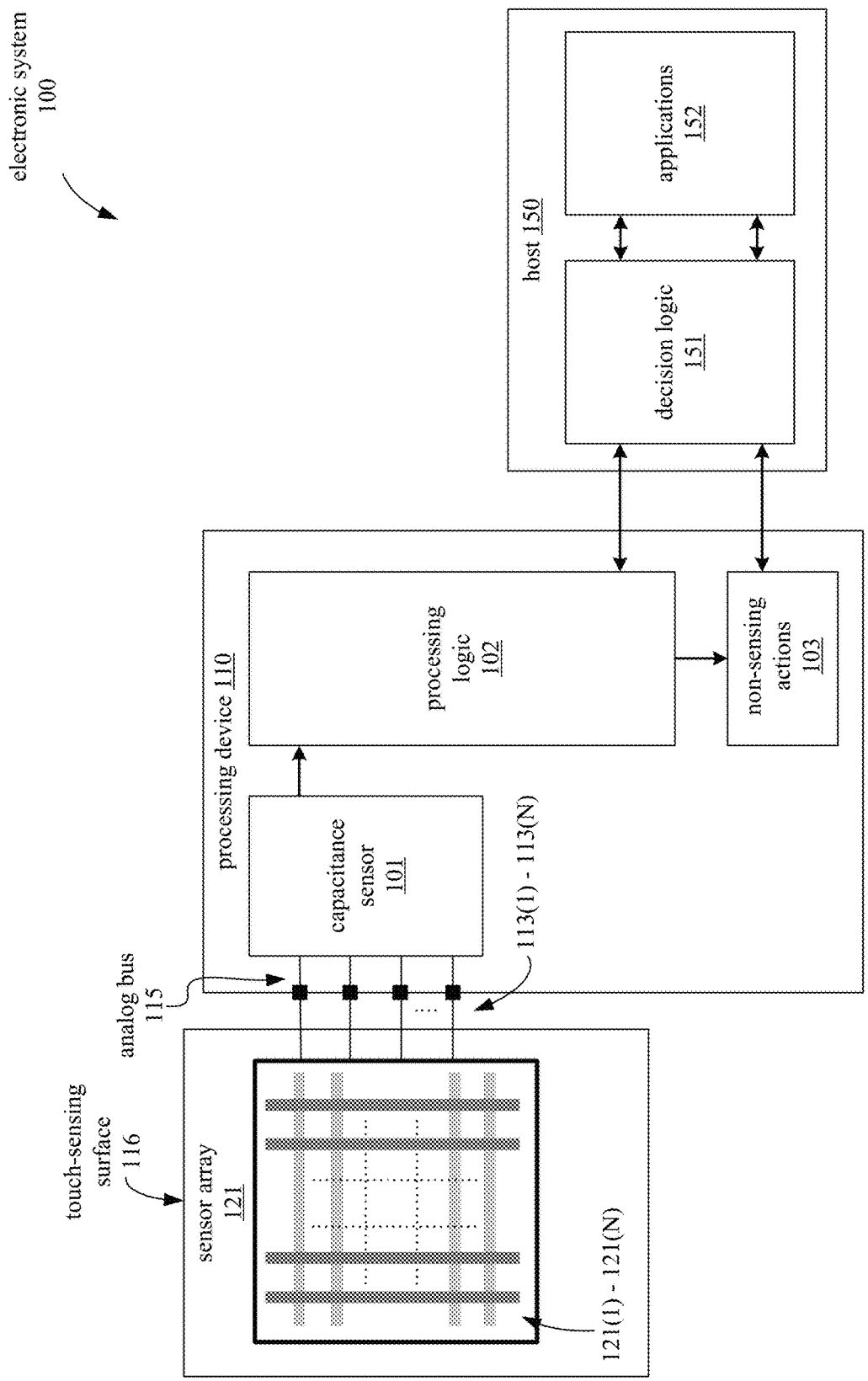
FIG. 1 is a block diagram illustrating an embodiment of an electronic system that processes fingerprint sensor data.

The following description sets forth numerous specific details such as examples of specific systems, components, methods, and so forth, in order to provide a good understanding of several embodiments of the claimed subject matter. It will be apparent to one skilled in the art, however, that at least some embodiments may be practiced without these specific details. In other instances, well-known components or methods are not described in detail or are presented in a simple block diagram format in order to avoid unnecessarily obscuring the claimed subject matter. Thus, the specific details set forth are merely exemplary. Particular implementations may vary from these exemplary details and still be contemplated to be within the spirit and scope of the claimed subject matter.

In one embodiment, a fingerprint sensor includes an array of capacitive sensor electrodes that are used for mutual capacitance scanning of a fingerprint. For the mutual capacitance scanning method, the capacitances between intersecting pairs of sensor electrodes are detected by transmitting a signal from a transmit (Tx) electrode in the pair to a receive (Rx) electrode in the pair. In a fingerprint sensor, the array of sensor electrodes may be overlaid with a protective coating or overlay that can be, for example, 50 µm or more in thickness. Mutual capacitance sensing of a fingerprint through an overlay of this thickness can yield a relatively small signal and a correspondingly small signal-to-noise ratio (SNR). A small SNR leads to poor fingerprint image matching performance.

The SNR can be increased with the use of multiphase Tx (MPTx) scanning, where multiple Tx sensor electrodes are excited simultaneously. However, the use of MPTx scanning can increase the input baseline (i.e., offset) signal, leading to a decrease in the available dynamic range of the sensor. For example, in an embodiment where a low-noise amplifier (LNA) is used to amplify the Rx signal, an increased baseline can cause saturation of the LNA, ultimately resulting in undesired non-linear distortion. Conversely, a LNA that amplifies a high-baseline signal while operating in its linear range would be paired with a higher cost analog-to-digital converter (ADC) with a higher resolution and/or larger dynamic range so as to resolve the small fingerprint signal out of the large baseline signal.

In one embodiment, the fingerprint sensor includes a set of one or more compensation electrodes in addition to the Tx and Rx sensor electrodes in the capacitive sensor array. The set of compensation electrodes can be used to compensate for unwanted signal components. In one embodiment, the compensation electrodes are used to generate a compensation signal that can be combined with the Rx signal to reduce the unwanted signal components. Unwanted signal components in the Rx signal may include, for example, the increased baseline signal resulting from the MPTx measurement method, noise injected by a finger, or another component of the Rx signal originating from a source other than the signal of interest (i.e., a fingerprint contact at the sensing area).

Baseline compensation can be achieved by injecting compensation charge using baseline compensation electrodes that are capacitively coupled to one or more Tx electrodes, but isolated from the fingerprint sensing area. For example, the baseline compensation electrodes may be located away from where a finger would likely be placed or swiped, or may be electrically shielded from the sensing area. The Tx signal applied to the one or more Tx electrodes induces a compensation signal that is a baseline compensation current via capacitive coupling to the baseline compensation electrodes. The baseline compensation current reduces the baseline current generated from the MPTx sensing of the sensor electrodes in the sensing area.

In one embodiment, one or more of the compensation electrodes may be utilized as a noise listener electrode for high sensitivity measurement and cancelation of noise in real time. The noise listener electrode may be located in an area where it can receive a noise signal injected by the fingertip, such as outside and adjacent to the sensing area, or within the sensing area. The noise injected from the fingertip can then be measured simultaneously with the mutual capacitance measurement of the primary capacitive sensor array. In one embodiment, the area of the noise listener electrode is substantially equal to the area of a regular Rx electrode so that capacitive coupling to the finger is equal. The noise listener electrode can thus be used to generate a compensation signal that can be used to reduce the unwanted noise component of the Rx signal.

FIG. 1 illustrates a block diagram of one embodiment of an electronic system 100 including a processing device 110 that may be configured to generate a fingerprint image by measuring capacitances from a touch sensing surface 116 including a capacitive sensor array. The electronic system 100 includes a touch-sensing surface 116 (e.g., fingerprint sensor) coupled to the processing device 110 and a host 150. In one embodiment, the touch-sensing surface 116 is a two-dimensional user interface that uses a sensor array 121 to detect touches on the surface 116.

In one embodiment, the sensor array 121 includes sensor electrodes 121(1)-121(N) (where N is a positive integer) that are disposed as a two-dimensional matrix (also referred to as an XY matrix). The sensor array 121 is coupled to pins 113(1)-113(N) of the processing device 110 via one or more analog buses 115 transporting multiple signals. In this embodiment, each sensor electrode 121(1)-121(N) is represented as a capacitor.

In one embodiment, the capacitance sensor 101 may include a relaxation oscillator or other means to convert a capacitance into a measured value. The capacitance sensor 101 may also include a counter or timer to measure the oscillator output. The processing device 110 may further include software components to convert the count value (e.g., capacitance value) into a sensor electrode detection decision (also referred to as switch detection decision) or relative magnitude. It should be noted that there are various known methods for measuring capacitance, such as current versus voltage phase shift measurement, resistor-capacitor charge timing, capacitive bridge divider, charge transfer, successive approximation, sigma-delta modulators, charge-accumulation circuits, field effect, mutual capacitance, frequency shift, or other capacitance measurement algorithms. It should be noted however, instead of evaluating the raw counts relative to a threshold, the capacitance sensor 101 may be evaluating other measurements to determine the user interaction. For example, in the capacitance sensor 101 having a sigma-delta modulator, the capacitance sensor 101 is evaluating the ratio of pulse widths of the output, instead of the raw counts being over or under a certain threshold.

In one embodiment, the processing device 110 further includes processing logic 102. Operations of the processing logic 102 may be implemented in firmware; alternatively, it may be implemented in hardware or software. The processing logic 102 may receive signals from the capacitance sensor 101, and determine the state of the sensor array 121, such as whether an object (e.g., a finger) is detected on or in proximity to the sensor array 121 (e.g., determining the presence of the finger), tracking the motion of the object, detecting features (e.g., fingerprint ridges and valleys) based on the received signals, or other information related to an object detected at the touch sensor.

In another embodiment, instead of performing the operations of the processing logic 102 in the processing device 110, the processing device 110 may send the raw data or partially-processed data to the host 150. The host 150, as illustrated in FIG. 1, may include decision logic 151 that performs some or all of the operations of the processing logic 102. Operations of the decision logic 151 may be implemented in firmware, hardware, software, or a combination thereof. The host 150 may include a high-level Application Programming Interface (API) in applications 152 that perform routines on the received data, such as compensating for sensitivity differences, other compensation algorithms, baseline update routines, start-up and/or initialization routines, interpolation operations, or scaling operations. The operations described with respect to the processing logic 102 may be implemented in the decision logic 151, the applications 152, or in other hardware, software, and/or firmware external to the processing device 110. In some other embodiments, the processing device 110 is the host 150.

In another embodiment, the processing device 110 may also include a non-sensing actions block 103. This block 103 may be used to process and/or receive/transmit data to and from the host 150. For example, additional components may be implemented to operate with the processing device 110 along with the sensor array 121 (e.g., keyboard, keypad, mouse, trackball, LEDs, displays, or other peripheral devices).

The processing device 110 may reside on a common carrier substrate such as, for example, an integrated circuit (IC) die substrate, or a multi-chip module substrate. Alternatively, the components of the processing device 110 may be one or more separate integrated circuits and/or discrete components. In one embodiment, the processing device 110 may be the Programmable System on a Chip (PSoC™) processing device, developed by Cypress Semiconductor Corporation, San Jose, Calif. Alternatively, the processing device 110 may be one or more other processing devices known by those of ordinary skill in the art, such as a microprocessor or central processing unit, a controller, special-purpose processor, digital signal processor (DSP), an application specific integrated circuit (ASIC), a field programmable gate array (FPGA), or other programmable device. In an alternative embodiment, for example, the processing device 110 may be a network processor having multiple processors including a core unit and multiple micro-engines. Additionally, the processing device 110 may include any combination of general-purpose processing device(s) and special-purpose processing device(s).

In one embodiment, the electronic system 100 is implemented in a device that includes the touch-sensing surface 116 as the user interface, such as handheld electronics, portable telephones, cellular telephones, notebook computers, personal computers, personal data assistants (PDAs), kiosks, keyboards, televisions, remote controls, monitors, handheld multi-media devices, handheld video players, gaming devices, control panels of a household or industrial appliances, or other computer peripheral or input devices. Alternatively, the electronic system 100 may be used in other types of devices. It should be noted that the components of electronic system 100 may include all the components described above. Alternatively, electronic system 100 may include only some of the components described above, or include additional components not listed herein.

Figure 2:
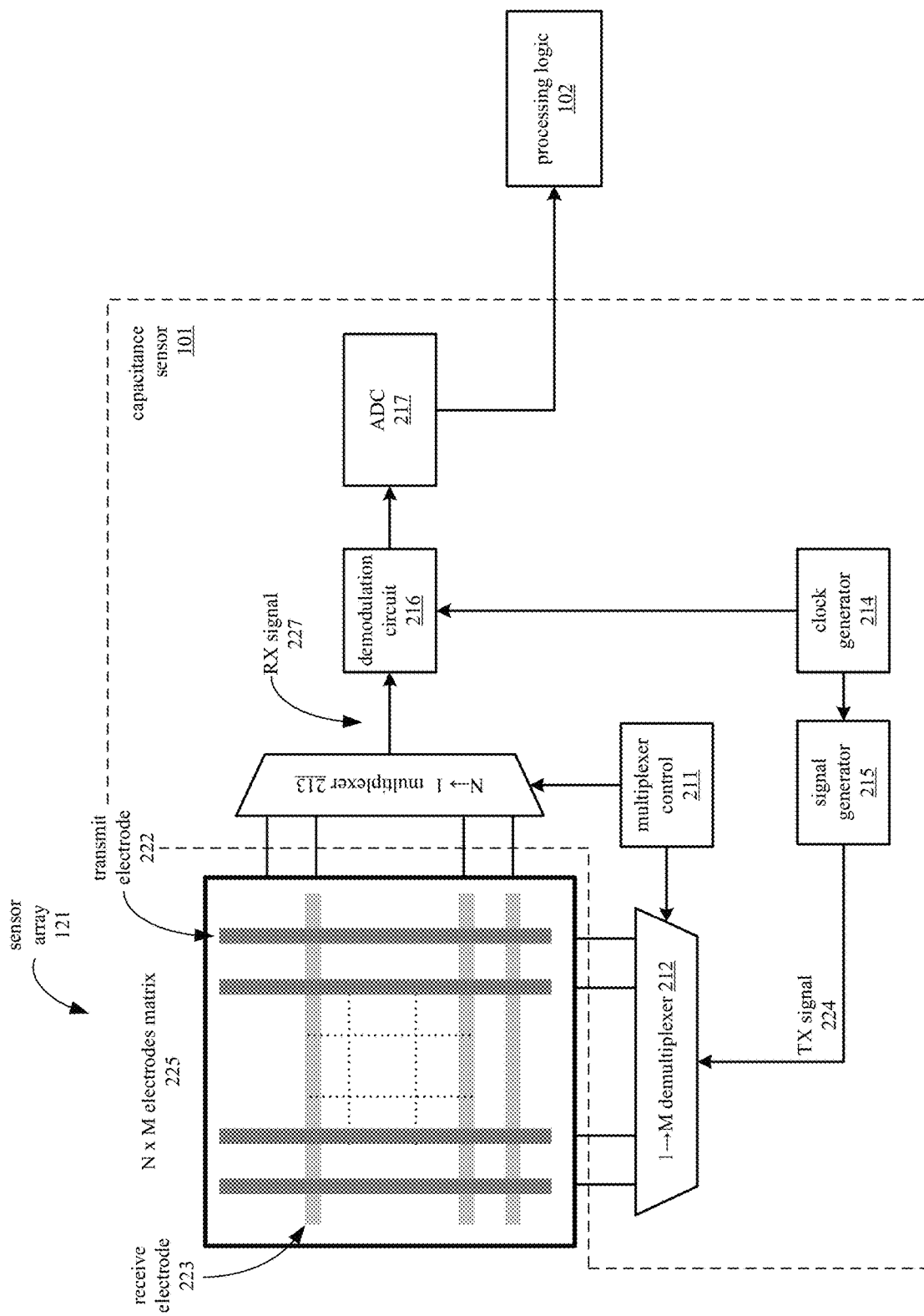
FIG. 2 is a block diagram illustrating an embodiment of an electronic system that processes fingerprint sensor data.

FIG. 2 is a block diagram illustrating one embodiment of a capacitive touch sensor array 121 and a capacitance sensor 101 that converts changes in measured capacitances to a fingerprint image. The coordinates are calculated based on changes in measured capacitances relative to the capacitances of the same touch sensor array 121 in an un-touched state. In one embodiment, sensor array 121 and capacitance sensor 101 are implemented in a system such as electronic system 100. Sensor array 121 includes a matrix 225 of N×M electrodes (N receive electrodes and M transmit electrodes), which further includes transmit (Tx) electrode 222 and receive (Rx) electrode 223. Each of the electrodes in matrix 225 is connected with capacitance sensing circuit 101 through demultiplexer 212 and multiplexer 213.

Capacitance sensor 101 includes multiplexer control 211, demultiplexer 212 and multiplexer 213, clock generator 214, signal generator 215, demodulation circuit 216, and analog to digital converter (ADC) 217.

The transmit and receive electrodes in the electrode matrix 225 may be arranged so that each of the transmit electrodes overlap and cross each of the receive electrodes such as to form an array of intersections, while maintaining galvanic isolation from each other. Thus, each transmit electrode may be capacitively coupled with each of the receive electrodes. For example, transmit electrode 222 is capacitively coupled with receive electrode 223 at the point where transmit electrode 222 and receive electrode 223 overlap.

Clock generator 214 supplies a clock signal to signal generator 215, which produces a Tx signal 224 to be supplied to the transmit electrodes of touch sensor 121 array. In one embodiment, the signal generator 215 includes a set of switches that operate according to the clock signal from clock generator 214. The switches may generate a Tx signal 224 by periodically connecting the output of signal generator 215 to a first voltage and then to a second voltage, wherein said first and second voltages are different.

The output of signal generator 215 is connected with demultiplexer 212, which allows the Tx signal 224 to be applied to any of the M transmit electrodes of sensor array 121. In one embodiment, multiplexer control 211 controls demultiplexer 212 so that the Tx signal 224 is applied to each transmit electrode 222 in a controlled sequence. Demultiplexer 212 may also be used to ground, float, or connect an alternate signal to the other transmit electrodes to which the Tx signal 224 is not currently being applied. In an embodiment utilizing MPTx sensing, different Tx signals may be applied to different subsets of Tx electrodes 222. For example, the Tx signal 224 may be presented in a true form to a subset of the Tx electrodes 222 and in complement or phase-altered form to a second subset of the transmit electrodes 222, where there is no overlap in members of the first and second subset of transmit electrodes 222. In alternative embodiments, the different Tx signals may be unrelated (i.e., not phase-shifted versions of each other).

Because of the capacitive coupling between the transmit and receive electrodes, the Tx signal 224 applied to each transmit electrode induces a current within each of the receive electrodes. For instance, when the Tx signal 224 is applied to transmit electrode 222 through demultiplexer 212, the Tx signal 224 induces an Rx signal 227 on the receive electrodes in matrix 225. The Rx signal 227 on each of the receive electrodes can then be measured in sequence by using multiplexer 213 to connect each of the N receive electrodes to demodulation circuit 216 in sequence.

The mutual capacitance associated with each intersection between a Tx electrode and an Rx electrode can be sensed by selecting every available combination of Tx electrode and an Rx electrode using demultiplexer 212 and multiplexer 213. To improve performance, multiplexer 213 may also be segmented to allow more than one of the receive electrodes in matrix 225 to be routed to demodulation circuits 216. In an optimized configuration, wherein there is a 1-to-1 correspondence of instances of demodulation circuit 216 with receive electrodes, multiplexer 213 may not be present in the system.

When a finger is in contact with the electrode matrix 225, the different fingerprint features cause different changes in the measured mutual capacitances between the electrodes. For example, a fingerprint ridge near the intersection of transmit electrode 222 and receive electrode 223 will decrease the charge coupled between electrodes 222 and 223 by a greater amount than a valley at the same location. Thus, the locations of fingerprint ridges and valleys on the sensor can be determined by identifying receive electrodes having a decrease in measured mutual capacitance in addition to identifying the Tx electrode at which the corresponding Tx signal 224 was applied. By determining the mutual capacitances associated with each intersection of electrodes in the matrix 225, the locations of fingerprint features may be determined. The determination may be sequential, in parallel, or may occur more frequently at commonly used electrodes. The induced Rx signal 227 is integrated by demodulation circuit 216. The rectified current output by demodulation circuit 216 can then be filtered and converted to a digital code by ADC 217, which can then be used to generate the fingerprint image.

In various embodiments, in order to acquire a usable fingerprint image, a capacitive fingerprint sensor array (e.g., such as sensor array 121) may be configured to include: an active (sensing) area in the range from 4×4 mm to 12×12 mm; a number of RX electrodes in the range from 100 to 150; TX and/or RX electrodes made of non-transparent metal material and having electrode pitch size in the range of from 0.04 mm to 0.08 mm; hardware sense elements that can detect/sense a finger-induced signal with capacitance of (approximately) 0.05 fF; and hardware timing elements that operate scan operations at a frequency in the range from 500 kHz to 30 MHz, with the sub-range of 5 MHz to 6 MHz being preferable for better skin sense. In such various embodiments, a finger contact typically covers all of the TX/RX electrodes of the capacitive fingerprint sensor array at the same time, which allows a processing device to acquire an accurate fingerprint image. Such structure and operational characteristics of a capacitive fingerprint sensor array differ substantially from the structure and operational characteristics of a typical capacitive touch (e.g., touchscreen) sensor array, which may be configured to include: an active (sensing) area of about 50×100 mm for a smartphone (and even larger active areas for tablets and laptop/notebook computers); a number of RX electrodes of about 10 to 20 depending on screen area and electrode pitch; TX and/or RX electrodes typically made of transparent (e.g., indium-tin oxide, or ITO) material and having electrode pitch size about 3 mm to 5 mm; hardware sense elements that can detect/sense a contact signal with capacitance of (approximately) 300 fF; and hardware timing elements that operate scan operations at a frequency of about 100 kHz to about 500 kHz. For a typical capacitive touch (e.g., touch-screen) sensor array, a contact from a single conductive object (e.g., user's finger or a stylus) typically covers only a small fraction of the touch-screen active area (e.g., touching 3 to 5 TX/RX electrodes at the same time), with some touch-screen applications allowing for detecting and tracking contacts from multiple conductive objects that collectively cover substantially less than all of the active area of the sensor array.

Figure 3:
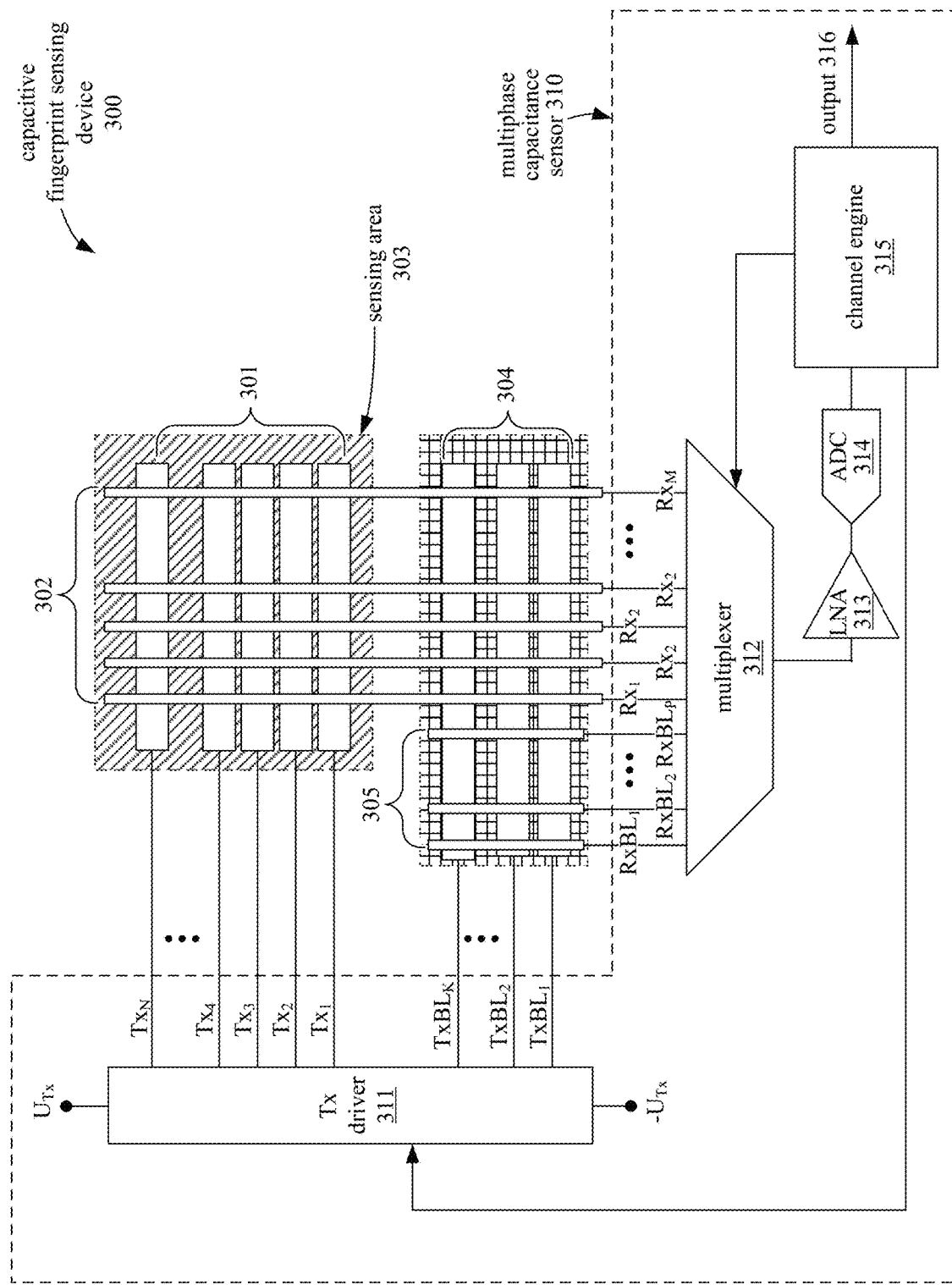
FIG. 3 illustrates an embodiment of a capacitive fingerprint sensing device.

FIG. 3 illustrates a capacitive fingerprint sensing device 300 that includes a set of capacitive sensor electrodes, according to an embodiment. The set of capacitive sensor electrodes includes a set of N Tx sensor electrodes 301 (including electrodes $Tx_1-Tx_N$) and a set of M Rx sensor electrodes 302 (including electrodes $Rx_1-Rx_M$). Each of the Tx sensor electrodes intersects each of the Rx sensor electrodes within a sensing area 303. The sensor electrodes 301 and 302 can be produced on a multilayer ball grid array substrate or on a flexible printed board.

The fingerprint sensing device 300 also includes baseline compensation electrodes 304 and 305 located outside the sensing area 303. Each of the K Tx baseline electrodes 304 (including electrodes $TxBL_1-TxBL_K$) intersects with each of the P Rx baseline electrodes 305 (including electrodes $RxBL_1-RxBL_P$), and each of the M Rx sensor electrodes 302.

The fingerprint sensing device 300 also includes a multiphase capacitance sensor 310, which includes a Tx driver 311, a multiplexer 312, a low noise amplifier (LNA) 313, an ADC 314, and a channel engine 315. The channel engine 315 performs a sensing scan of the sensor electrodes 301 and 302 by controlling the Tx driver 311 to apply Tx signals to the Tx sensor electrodes 301 and the Tx baseline electrodes 304. The Tx signal oscillations can be any of a variety of shapes: rectangular, sine, etc.

The Tx signals applied to the Tx sensor electrodes 301 and 304 induce Rx signals at the Rx sensor electrodes 302 and 305. The Rx sensor electrodes 302 in turn produce signals that depend on the features of the fingerprint pattern located over each intersection, or unit cell. The resulting set of Rx signals can be digitized to generate an image of a fingerprint contacting the sensing area 303.

For MPTx sensing, the channel engine 315 causes the Tx driver 311 to generate the Rx signals at the set of Rx sensor electrodes by applying the Tx signal with a first phase to a first subset of the set of Tx sensor electrodes while simultaneously applying the Tx signal with a second phase to a second subset of the set of Tx sensor electrodes. For example, during the measurement of Rx sensor electrode $Rx_1$, the Tx driver 311 may apply an original in-phase Tx signal to Tx sensor electrodes $Tx_2$, $Tx_6$, $Tx_7$, etc. while applying the opposite phase Tx signal to Tx sensor electrodes $Tx_1$, $Tx_3$, $Tx_4$, $Tx_5$, etc. For subsequent measurements of other Rx sensor electrodes, the in-phase and opposite phase Tx signals may be applied to the same or different subsets of Tx sensor electrodes.

Since some Tx signals are in phase and others are opposite phase, the resulting Rx output signal will be proportional to the number of Tx sensor electrodes excited by the in-phase Tx signal minus the number of Tx sensor electrodes excited by the opposite-phase Tx signal. This is also referred to as the net SUM for the MPTx sequence. The MPTx sequence produces a nonzero SUM value; for example, highly effective MPTx sequences can be found for which SUM is equal to 1, 2, 3, or 4. However, the net SUM charge also produces a large offset (i.e., baseline signal).

In order to reduce the baseline signal, the fingerprint sensing device 300 includes the baseline compensation electrodes, including Tx baseline electrodes 304 and Rx baseline electrodes 305. The Tx baseline electrodes have coupling capacitances to the Rx sensor electrodes similar to the Tx sensing electrodes. The Tx baseline electrodes can also be excited by the Tx driver 311 drivers, using the appropriate in-phase or opposite-phase Tx signals. In an alternative embodiment, the Tx baseline electrodes may be connected to an alternate power source (e.g., a power source providing a programmable signal magnitude) instead of the Tx driver 311.

The baseline electrodes 304 and 305 are capacitively isolated from the sensing area 303 to avoid capacitive coupling with the finger. In one embodiment, the baseline electrodes 304 and 305 are located near the sensing area 303 and are shielded from the sensing area by a ground plane. In an alternative embodiment, the baseline electrodes 304 and 305 can be located far enough away from the sensing area 303 that the capacitive coupling with the finger is minimized.

Multiphase capacitance sensor 310 generates a baseline compensation current from the Rx baseline electrodes 305 by applying the appropriate in-phase or opposite phase Tx signal to one or more of the Tx baseline electrodes 304 that are capacitively coupled to one or more of the Rx baseline electrodes 305. The resulting Rx baseline current is combined with and reduces a baseline current from the Rx sensing electrodes 302 that is generated by the multiphase sensing scan.

The baseline compensation electrodes are thus used to create a charge which compensates the baseline charge from the sensor array, so that in the absence of a finger contact at the sensing area, the signal received at the LNA 313 is minimized. When the finger then touches the surface of sensing area 303, the mutual capacitance of the intersections of the sensor array change in the presence of the fingerprint ridges and valleys. The changes in mutual capacitance due to the fingerprint features, which is the signal of interest, can then be more easily amplified using a larger portion of the dynamic range of the LNA 313. Thus, reducing the baseline charge also reduces the likelihood of operating the LNA 313 outside its linear range.

With reference to FIG. 3, different combinations of the Rx baseline electrodes 305 and the Tx baseline electrodes 304 can be selected to adjust the amount of baseline compensation current that is generated. In one embodiment, the baseline compensation current is adjusted to correspond to a particular MPTx mode. For example, the multiphase capacitance sensor 310 may support multiple MPTx modes, each having different SUM values. Accordingly, different combinations of Rx baseline electrodes 305 and Tx baseline electrodes 304 can be enabled to more accurately match the baseline current that is generated for a particular MPTx sensing mode. A particular Rx baseline electrode can be enabled by connecting it to the capacitance sensor 310 via the multiplexer 312, while a particular Tx baseline electrode is enabled by the Tx driver 311, which excites the enabled Tx baseline electrodes during the sensing scan.

In some embodiments, some or all of the Tx baseline electrodes may vary in their widths from other Tx baseline electrodes, while some or all of the Rx baseline electrodes may similarly vary in their widths relative to other Rx baseline electrodes. The dimensions of the Tx and Rx baseline electrodes may be selected at design time to make specific capacitance values and their corresponding baseline compensation current levels available for selection.

The sensing scan proceeds with the multiplexer 312 additionally selecting in sequence the Rx sensor electrodes (or sets of Rx sensor electrodes) for which the induced Rx signal is to be measured along with the combination of Rx baseline electrodes corresponding to the MPTx mode being used. In particular, the multiplexer selects the previously determined combination of Rx baseline electrodes that most accurately matches the baseline current that is generated by the MPTx mode being used. The Rx signal induced on the selected Rx sensor electrodes is received and amplified by LNA 313, then converted to digital values by ADC 314. The channel engine 315 receives the digital values and deconvolutes the values to generate a fingerprint image at output 316. While FIG. 3 illustrates a single LNA 313, ADC 314, and channel engine 315, alternative embodiments may include multiple LNAs, ADCs, and channel engines operating in parallel.

Figure 4:
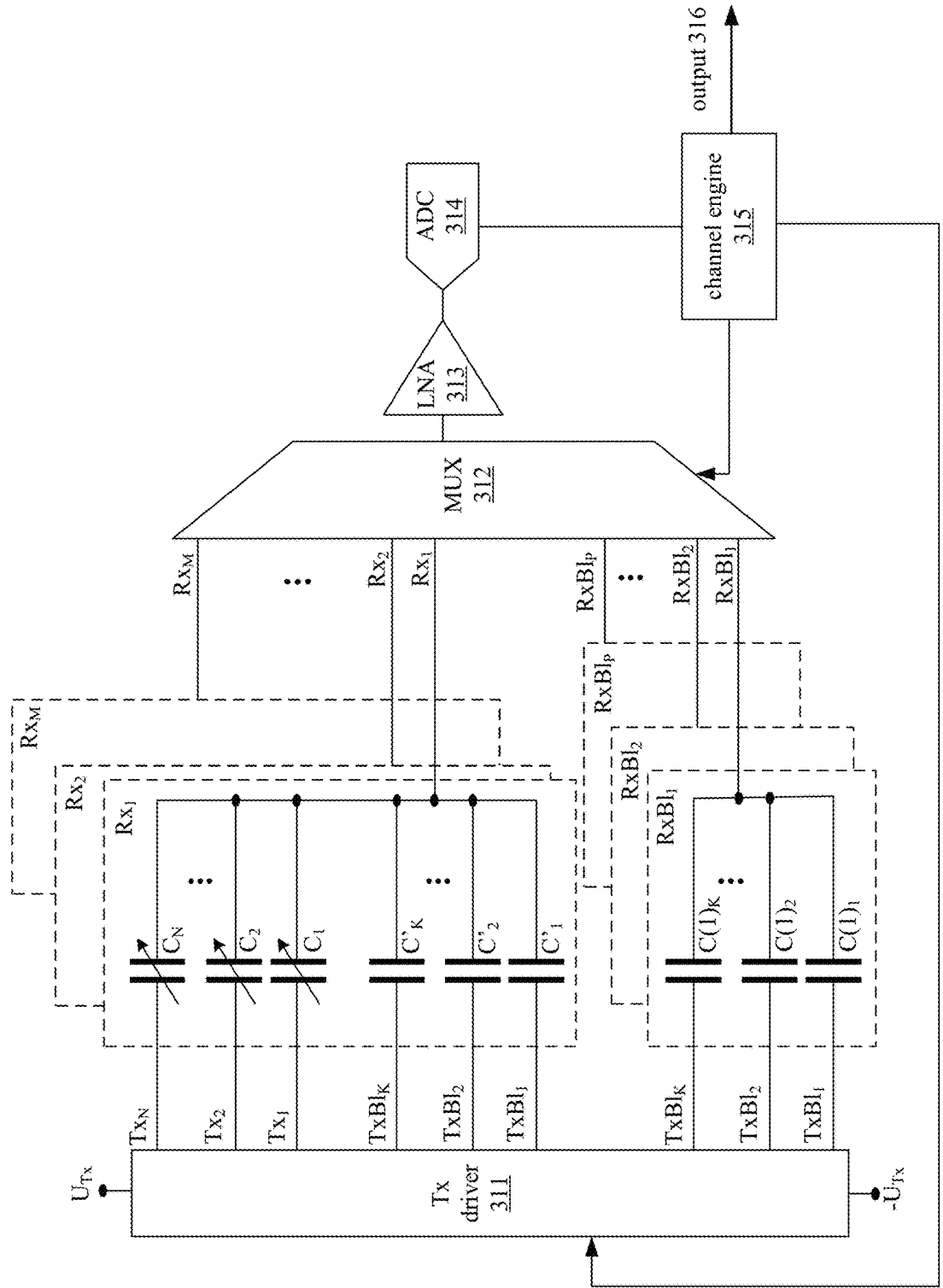
FIG. 4 illustrates an equivalent circuit for a capacitive fingerprint sensing device, according to an embodiment.

FIG. 4 illustrates an equivalent circuit for the capacitive fingerprint sensing device 300, according to an embodiment. In one embodiment, when no finger contact is present at the sensing area 303, the charge excited by Tx sensor electrodes is nominally compensated by charge excited by Tx baseline electrodes according to Equation 1 below, where $U_{Tx_n}$ represents the Tx electrode excitation voltage, $C_n$ represents the Tx-Rx mutual capacitance, $U_{TxBl_k}$ represents the Tx baseline electrode excitation voltage, $C'_k$ represents the mutual capacitance between Tx baseline electrodes and Rx sensor electrodes, and $C^{(p)}_k$ represents the mutual capacitance between Tx and Rx baseline electrodes TxBl(k) RxBl(p):

$$\Sigma_{n=1}^{N} U_{Tx_n} \times C_n = \Sigma_{k=1}^{K} U_{TxBl_k} \times [C'_k + \Sigma_{p=1}^{P} C^{(p)}_k] \qquad \text{(Equation 1)}$$

In practice, an embodiment of a fingerprint sensing device 300 may generate a baseline compensation charge that substantially compensates for the baseline current by minimizing the baseline current to the extent possible in light of manufacturing costs, tolerances, environmental factors, etc. In alternative embodiments, the baseline compensation charge may reduce the baseline current to a sufficiently low level for achieving a desired target SNR.

Figure 5A:
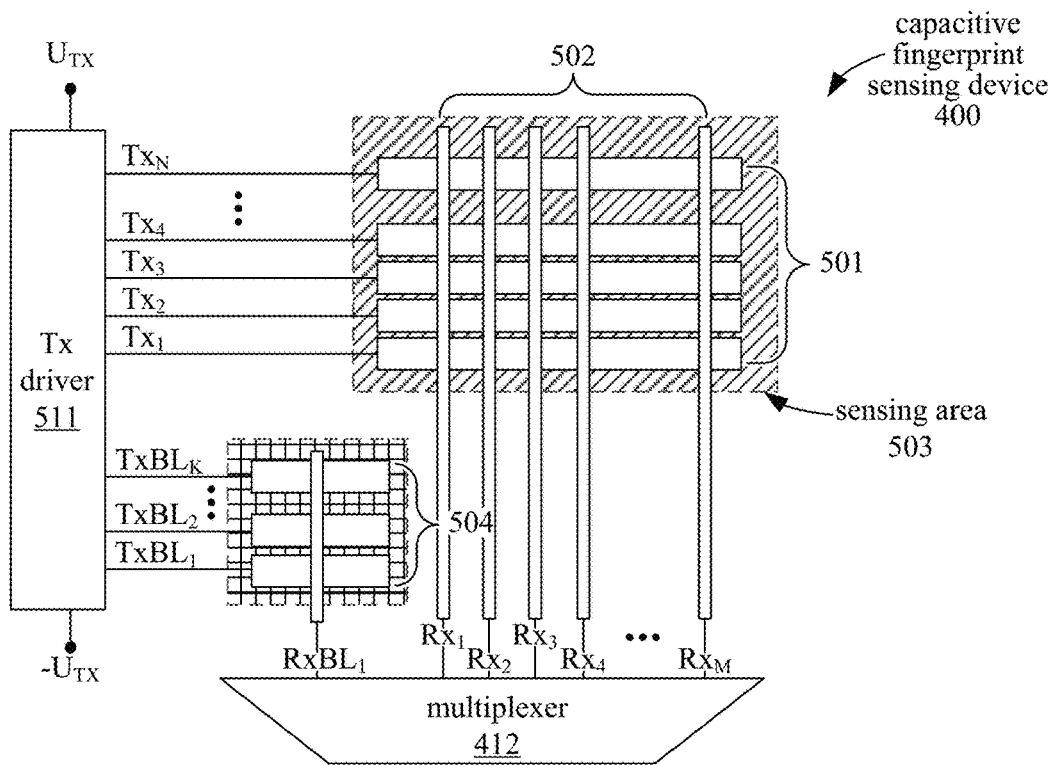
FIGS. 5A and 5B illustrate embodiments of capacitive fingerprint sensing devices.

FIG. 5A illustrates an embodiment of a capacitive fingerprint sensing device 400 that includes Tx sensor electrodes 501 and Rx sensor electrodes 502. Each of the Tx sensor electrodes 501 intersects with each of the Rx sensor electrodes 502 in a sensing area 503. The Tx sensor electrodes 501 are driven with a Tx signal by Tx driver 511 to induce an Rx signal at the Rx sensor electrodes 502. The multiplexer 512 selectively connects the Rx sensor electrodes (individually, or in sets) to an analog input (e.g., a LNA), similar to sensing device 300 illustrated in FIG. 3.

The sensing device 400 also includes a single Rx baseline electrode RxBL that is capacitively coupled with K Tx baseline electrodes 504 (including electrodes $TxBL_1$–$TxBL_K$). Sensing device 400 is capable of supporting multiple MPTx modes, each having different SUM values and thus generating different baseline currents, by selectively enabling a selected subset of Tx baseline electrodes 504 via Tx driver 511.

Figure 5B:
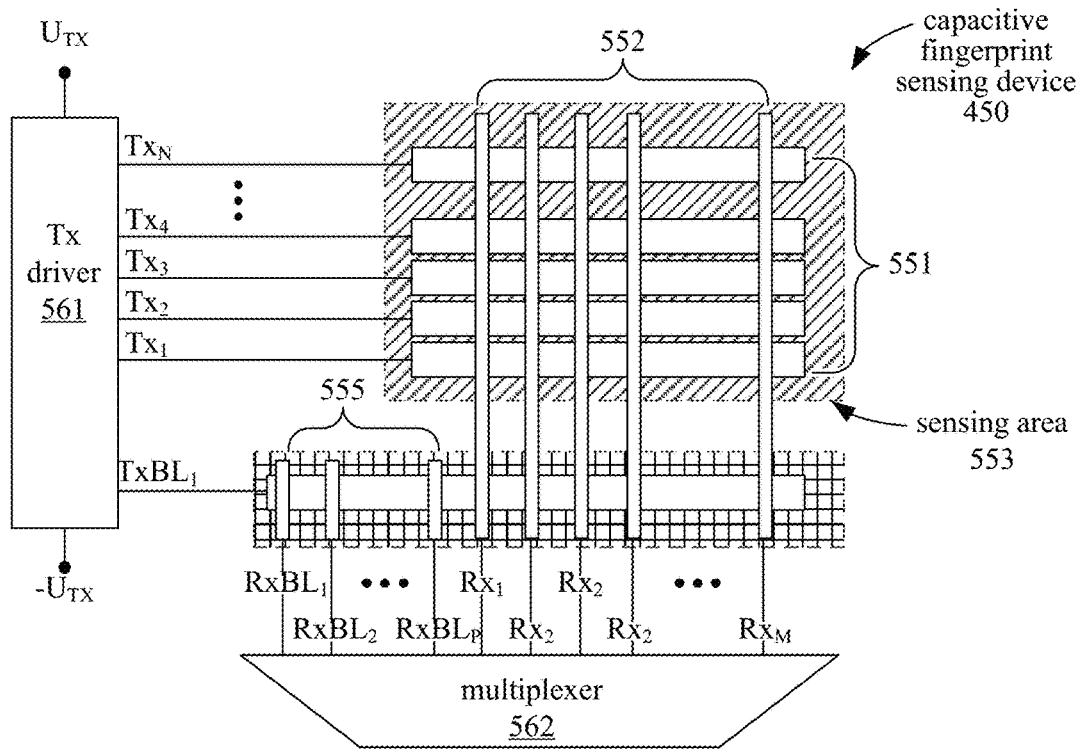

FIG. 5B illustrates an embodiment of a capacitive fingerprint sensing device 450 that includes Tx sensor electrodes 551 and Rx sensor electrodes 552. Each of the Tx sensor electrodes 551 intersects with each of the Rx sensor electrodes 552 in a sensing area 553. The Tx sensor electrodes 551 are driven with a Tx signal by Tx driver 561 to induce an Rx signal at the Rx sensor electrodes 552. The multiplexer 562 selectively connects the Rx sensor electrodes (individually, or in sets) to an analog input (e.g., a LNA), similar to sensing device 300 illustrated in FIG. 3.

The sensing device 450 also includes a single Tx baseline electrode TxBL that is capacitively coupled with P Rx baseline electrodes 555 (including electrodes $RxBL_1$–$RxBL_P$). Sensing device 450 is capable of supporting multiple MPTx modes, by selectively enabling a selected subset of Rx baseline electrodes 555 via multiplexer 562. In particular, each of the Rx baseline electrodes 555 is connected to a switch in multiplexer 562 configured to selectively connect the Rx baseline electrode to an analog input (e.g., an LNA) of a multiphase capacitance sensor based on a selected MPTx sensing mode for performing the sensing scan.

In addition to the on-sensor compensation via baseline compensation electrodes as described above, some embodiments may also implement in-chip compensation methods, such as a programmable current source for supplying additional baseline compensation current. In alternative embodiments, the baseline compensation electrodes as described above may be implemented in types of capacitive touch sensing surfaces other than fingerprint sensors, such as capacitive touchpads or touch screens.

Figure 6:
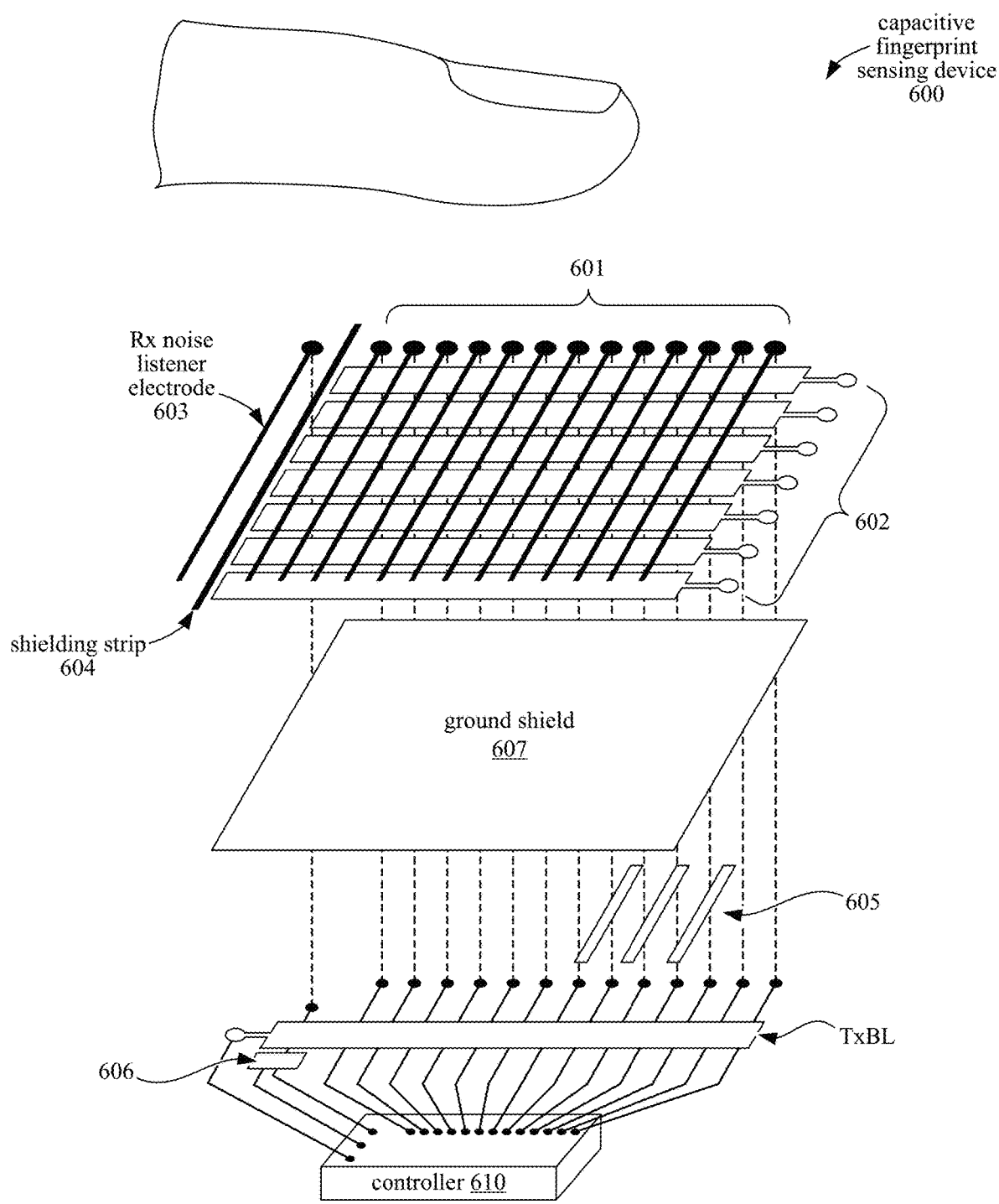
FIG. 6 illustrates an embodiment of a capacitive fingerprint sensing device.

FIG. 6 illustrates an embodiment of a capacitive fingerprint sensing device 600 that includes a set of compensation electrodes: Tx baseline electrode TxBL, Rx baseline electrodes 605, and noise listener electrode 603. As illustrated, sensing device 600 includes multiple Tx sensor electrodes 601 that each intersect with multiple Rx sensor electrodes 602 within a sensing area.

The set of Tx sensor electrodes 601 is formed from a first layer of conductive material (e.g., copper, indium tin oxide, etc.) overlying the set of Rx sensor electrodes 602, while the set of Rx sensor electrodes 602 is formed from a second layer of conductive material overlying the one or more baseline compensation electrodes 605 and TxBL. The baseline compensation electrodes TxBL and 605 are shielded from the sensing area by a grounded shield 607 interposed between the set of baseline compensation electrodes TxBL and 605 and the set of sensor electrodes 601 and 602.

The Rx noise listener electrode 603 may be located inside or outside the sensing area; as illustrated in FIG. 6, the noise listener electrode 603 is located at an edge of the sensing area. In one embodiment, noise listener electrode 603 has a surface area that is substantially equal to a surface area of one or more of the Rx sensor electrodes 602 to achieve a similar amount of capacitive coupling with the finger. The noise listener electrode 603 is shielded from the nearby Tx sensor electrodes 601 by a shielding strip 604. Rx noise listener electrode 603 is capacitively coupled to Tx adjustment electrode 606. The electrodes 603 and 606 are coupled to the controller 610 that includes a multiphase capacitance sensor. The multiphase capacitance sensor includes a Tx driver and a LNA to transmit Tx signals and receive Rx signals, respectively. The multiphase capacitance sensor in controller 610 is thus configured to measure noise received through the noise listener electrode 603 contemporaneously with a sensing scan of the sensor electrodes 601 and 602. With this arrangement, noise injected from the fingertip can be measured simultaneously with the scanning of the sensor electrode array.

Figure 7:
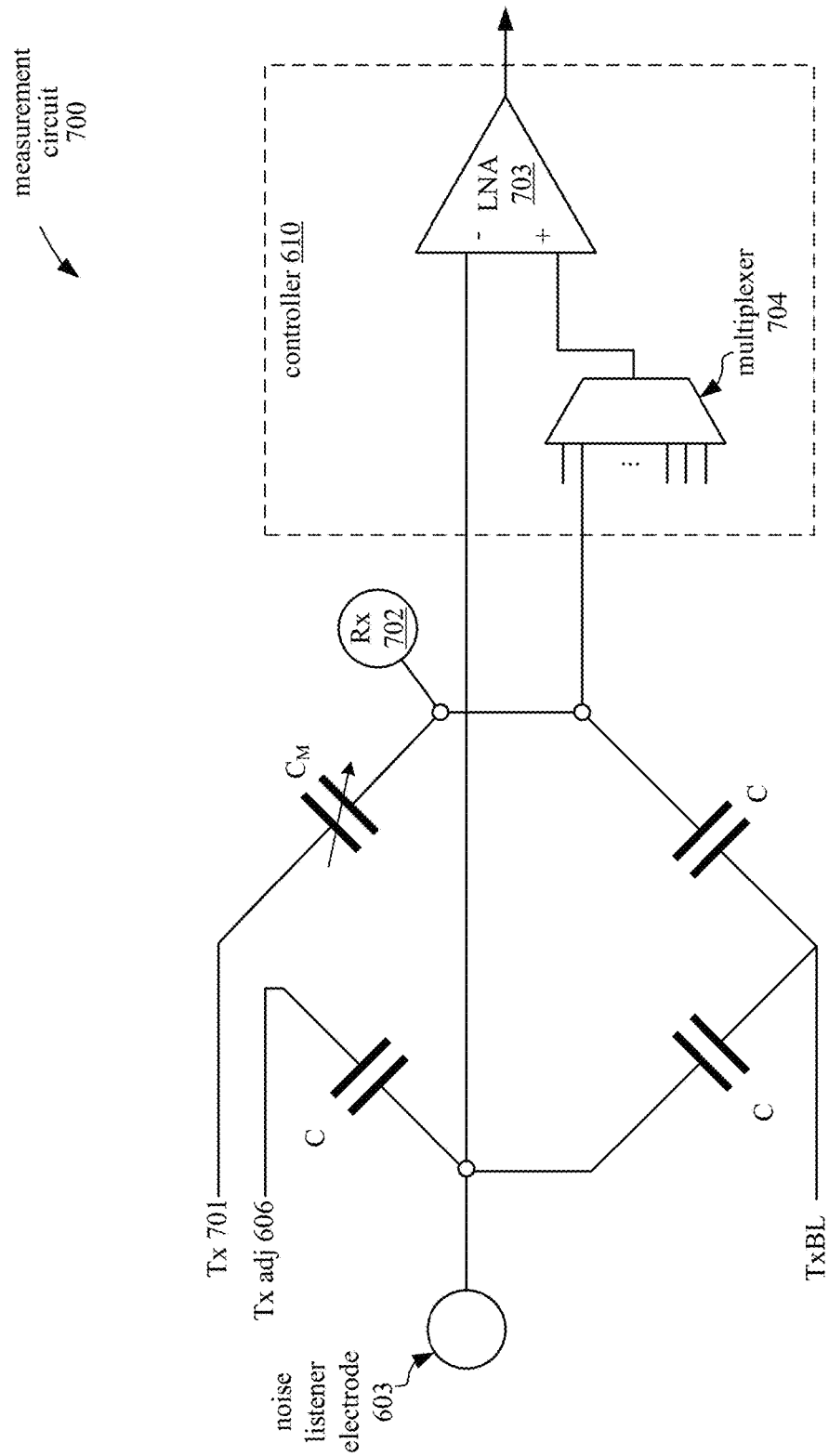
FIG. 7 illustrates an embodiment of a measurement circuit for a capacitive fingerprint sensing device.

FIG. 7 illustrates a measurement circuit 700 for the capacitive fingerprint sensing device 600, according to an embodiment. Circuit 700 includes a full bridge measurement circuit for measuring the signal at the noise listener electrode 603. The legs of the bridge circuit are composed of capacitances C and CM between the different electrodes of the sensor pattern, as indicated in FIG. 7. The outputs of the bridge circuit are applied to the positive and negative inputs of LNA 703, which generates the amplified noise signal.

The mutual capacitance CM between the Tx sensor electrode 701 and the Rx sensor electrode 702 is measured along with the noise signal via noise listener electrode 603. Thus, the measured noise signal corresponds to the noise component of the Rx signal measured via the mutual capacitance CM and can be used to reduce the noise component of the Rx signal. Multiplexer 704 allows a single Rx sensor electrode (or set of Rx sensor electrodes) to be selected for measurement.

In the circuit 700, the voltage at the baseline compensation electrode TxBL (at the bottom of the bridge circuit) is the negative of the Tx voltage applied to Tx electrode 701 (at the top of the bridge circuit). The voltage at the Tx adjustment electrode 606 can be varied to adjust the measured noise signal.

Figure 8:
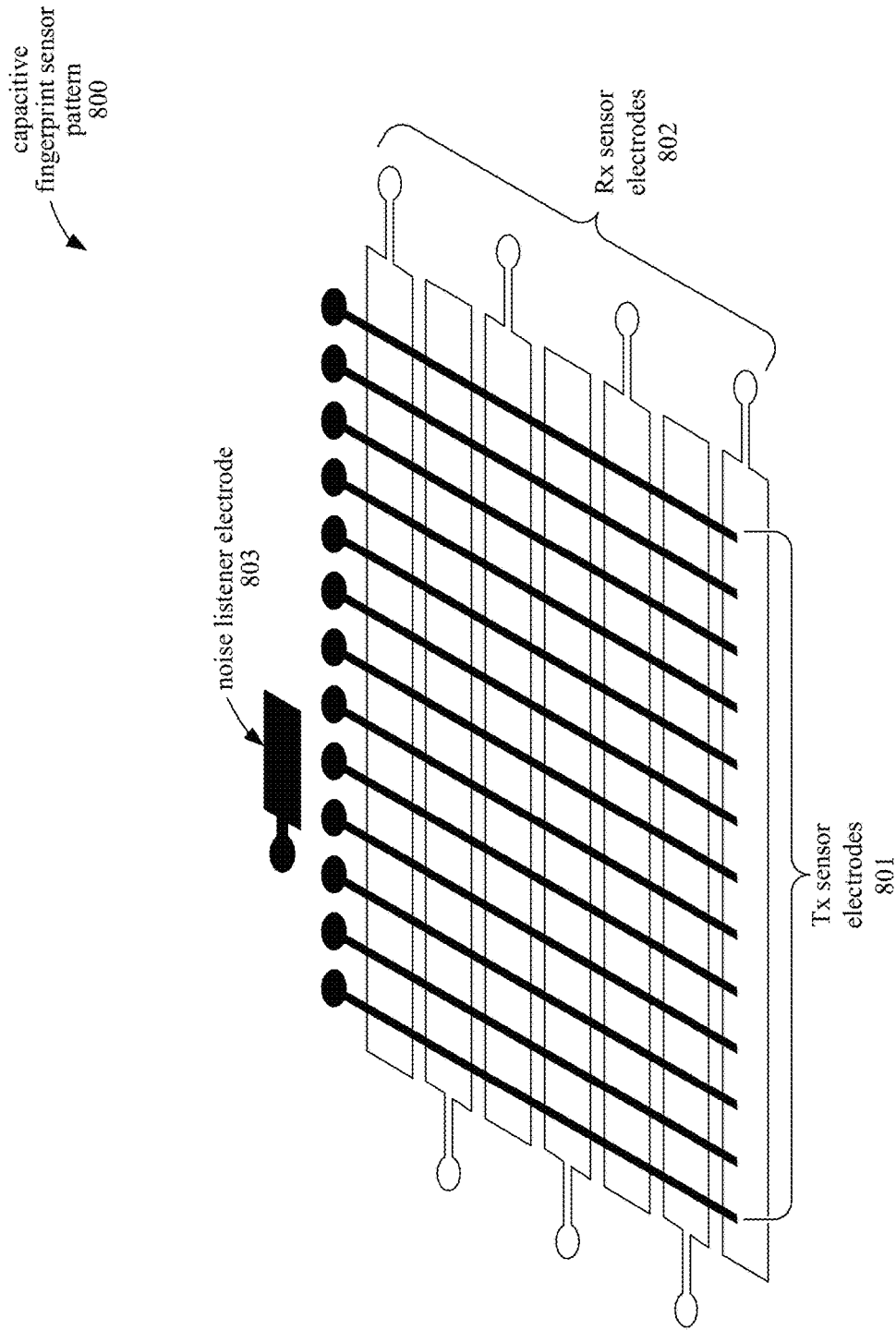
FIG. 8 illustrates an embodiment of a capacitive fingerprint sensor pattern.

FIG. 8 illustrates an alternative placement for a noise listener electrode 803 in an embodiment of a capacitive fingerprint sensor pattern 800. Sensor pattern 800 includes multiple Tx sensor electrodes 801 each intersecting with multiple Rx sensor electrodes 802 within a sensing area. The noise listener electrode 803 in sensor pattern 800 is located outside the sensing area. The noise listener electrode 803 is formed from a top layer of conductive material, along with the Tx sensor electrodes 801.

In alternative embodiments, the noise listener electrode 803 can be located at any of the four sides of the sensor pattern 800, and may be an arbitrary shape. In alternative embodiments, the noise listener electrode 803 and the Rx sensor electrodes 802 are formed from the top layer of conductive material and lie above the Tx sensor electrodes.

Figure 9A:
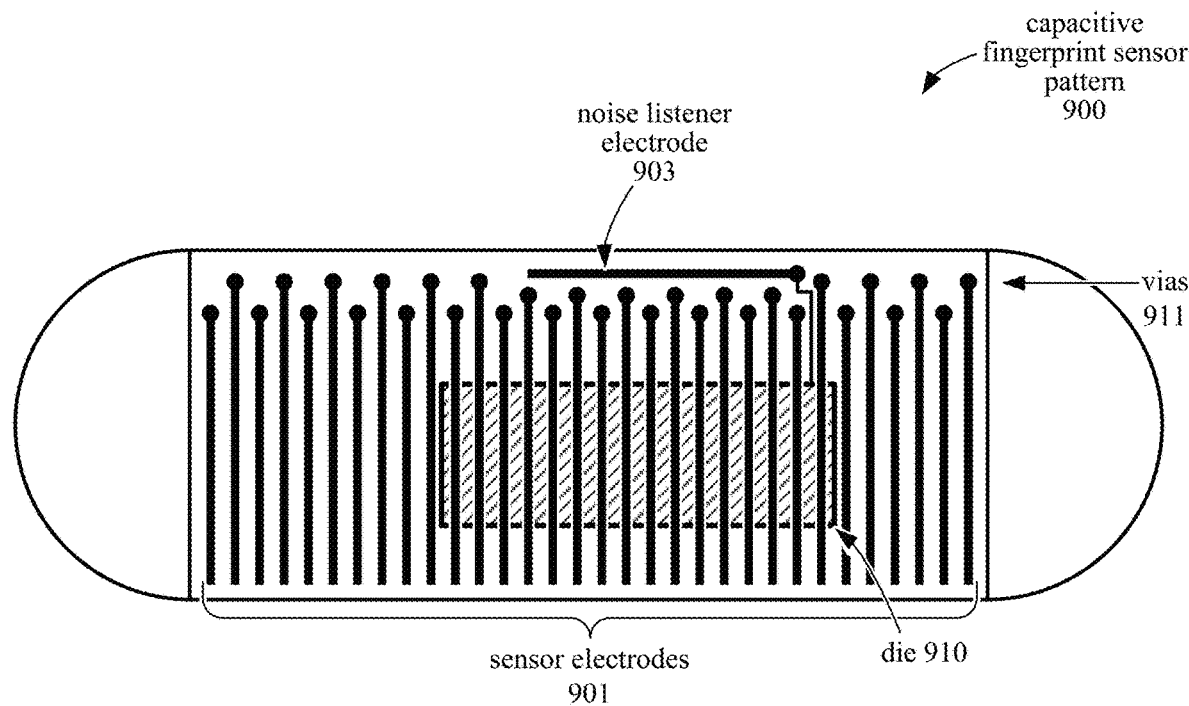
FIGS. 9A and 9B illustrate embodiments of capacitive fingerprint sensor patterns.

FIG. 9A illustrates an embodiment of a capacitive fingerprint sensor pattern 900 that includes a noise listener electrode 903 located at an edge of the sensor pattern 900. The sensor pattern 900 includes sensor electrodes 901, which may represent the Tx or Rx sensor electrodes in a capacitive sensor array (for clarity, intersecting electrodes are not illustrated). The sensor electrodes 901 are connected through vias 911 to traces on one or more underlying layers and then to the die 910, in which a multiphase capacitance sensor is implemented. The noise listener electrode 903 is located at the edge of the sensing area along the row of vias 911. In one embodiment, the sensor pattern 900 has dimensions of 9 millimeters (mm) by 4 mm.

Figure 9B:
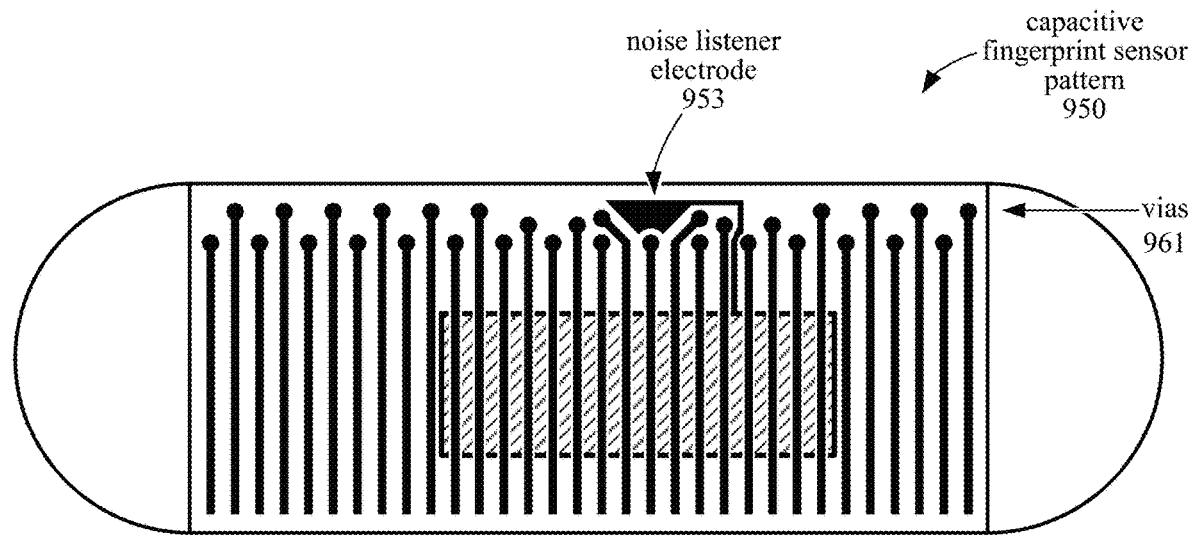

FIG. 9B illustrates an embodiment of a similar capacitive fingerprint sensor pattern 950 that includes a differently shaped noise listener electrode 953 located at an edge of the sensor pattern 900 and in between vias 961. In sensor pattern 950, some of the vias 961 are placed according to an irregular pattern to accommodate the shape and position of the noise listener electrode 953.

Figure 10:
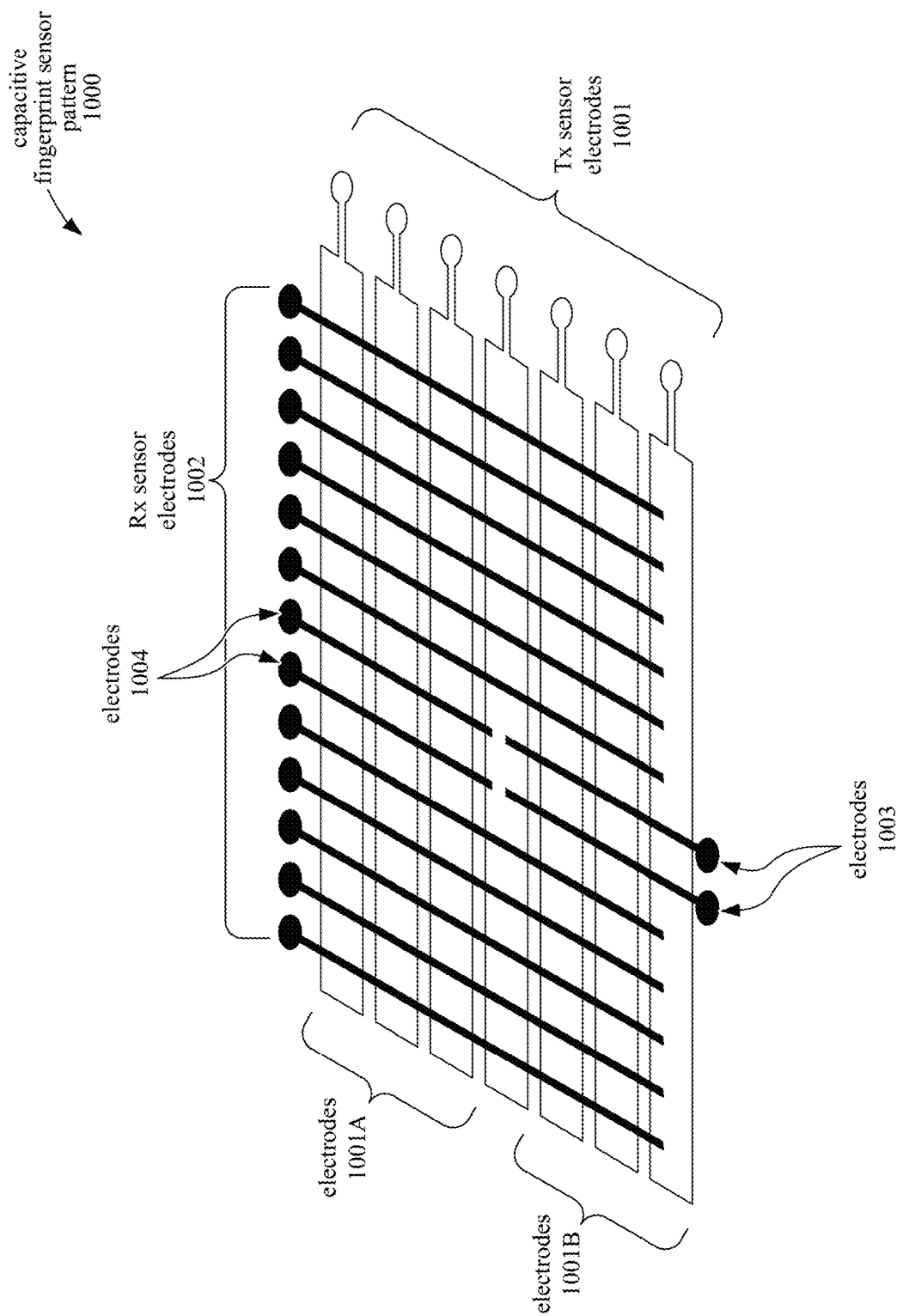
FIGS. 10 and 11 illustrate embodiments of capacitive fingerprint sensor patterns.

FIG. 10 illustrates an embodiment of a capacitive fingerprint sensor pattern 1000 that includes multiple Tx sensor electrodes 1001 that each intersect with multiple Rx sensor electrodes 1002 within a sensing area. For a larger touch sensor area (e.g., when the sensing area is larger than the contact area of a finger), the finger contact may miss overlapping with a noise listener electrode that is located at an edge of the sensing area. Thus, the sensor pattern 1000 utilizes two of the sensor electrodes 1003 as Tx sensor electrodes during one time period and noise listener electrodes during a different time period.

When one of the Tx sensor electrodes 1001A in the top half of the sensing area is energized, mutual capacitances of intersections with Rx sensor electrodes in the top half can be measured while the electrodes 1003 in the bottom half of the sensing area are used as Rx noise listener electrodes. When one of the Tx sensor electrodes 1001B in the bottom half of the sensing area is energized, mutual capacitances of intersections with Rx sensor electrodes 1002 in the bottom half of the sensing area can be measured while electrodes 1004 in the top half of the sensing area are used as noise listener electrodes.

In one embodiment, the area of each of the two electrodes 1003 is substantially equal to half of the area of one of the Rx sensor electrodes 1002. When the two electrodes 1003 are multiplexed in parallel, the combined area becomes substantially equal to the area of one of the regular Rx sensor electrodes 1002. Accordingly, the noise coupled from the fingertip to the electrode pair 1003 is substantially equal to the noise injected into a regular Rx electrode (assuming the electrodes are at equal potentials). In one embodiment, the noise signal from the electrode pair 1003 can then be measured using a differential measurement circuit.

Figure 11:
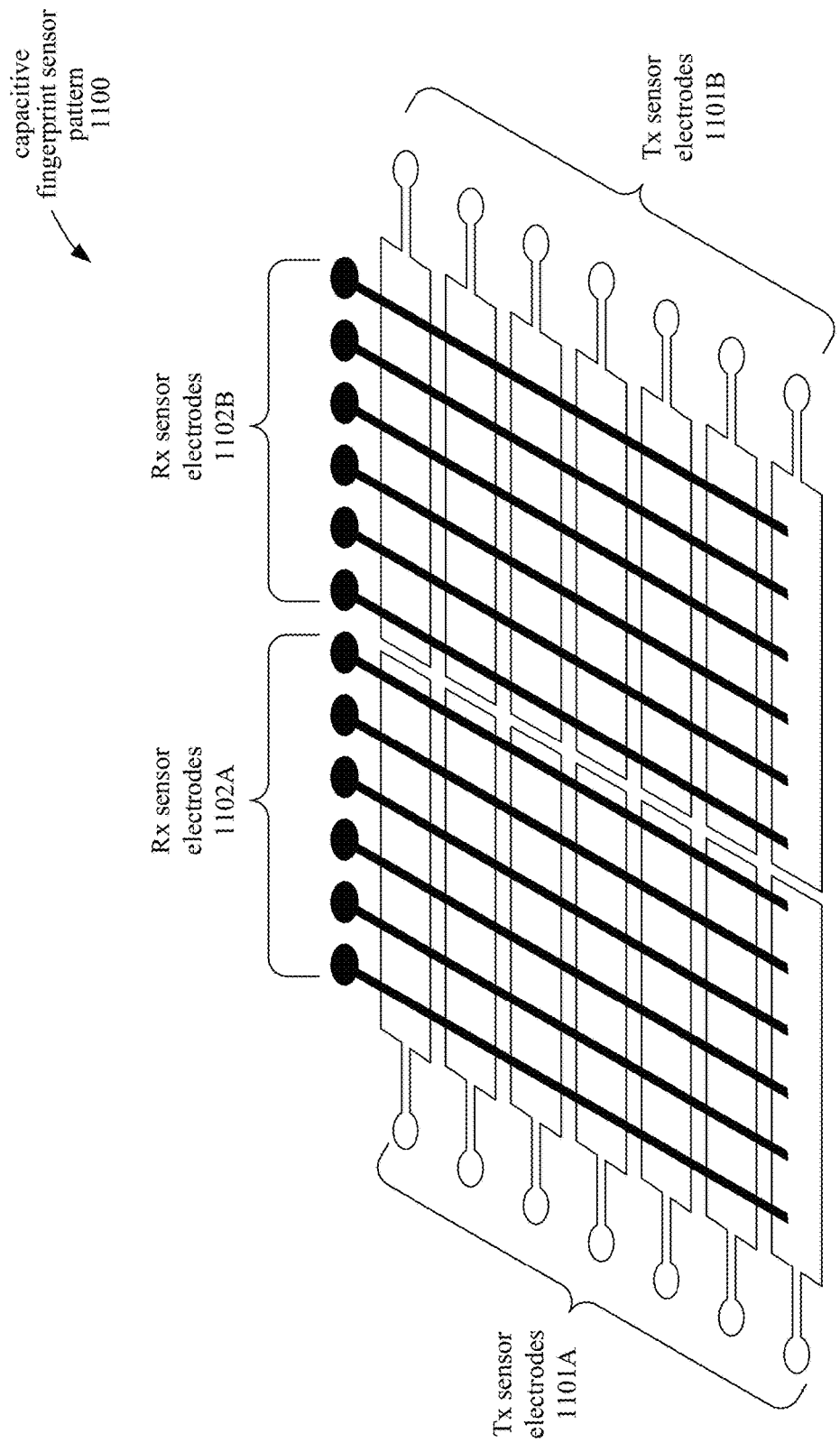

FIG. 11 illustrates an embodiment of a capacitive fingerprint sensor pattern 1100 having two sets of Tx sensor electrodes 1101A and 1101B, where the electrodes 1101A are located in the left half of the sensing area and electrodes 1101E are located in the right half of the sensing area. Thus, each Tx row includes two Tx sensor electrodes. When one of the Tx sensor electrodes 1101A is energized, any of the Rx sensor electrodes 1102B can be used as a noise listener electrode. When one of the Tx sensor electrodes 1101E is energized, any of the Rx sensor electrodes 1102A can be used as a noise listener electrode.

Figure 12:
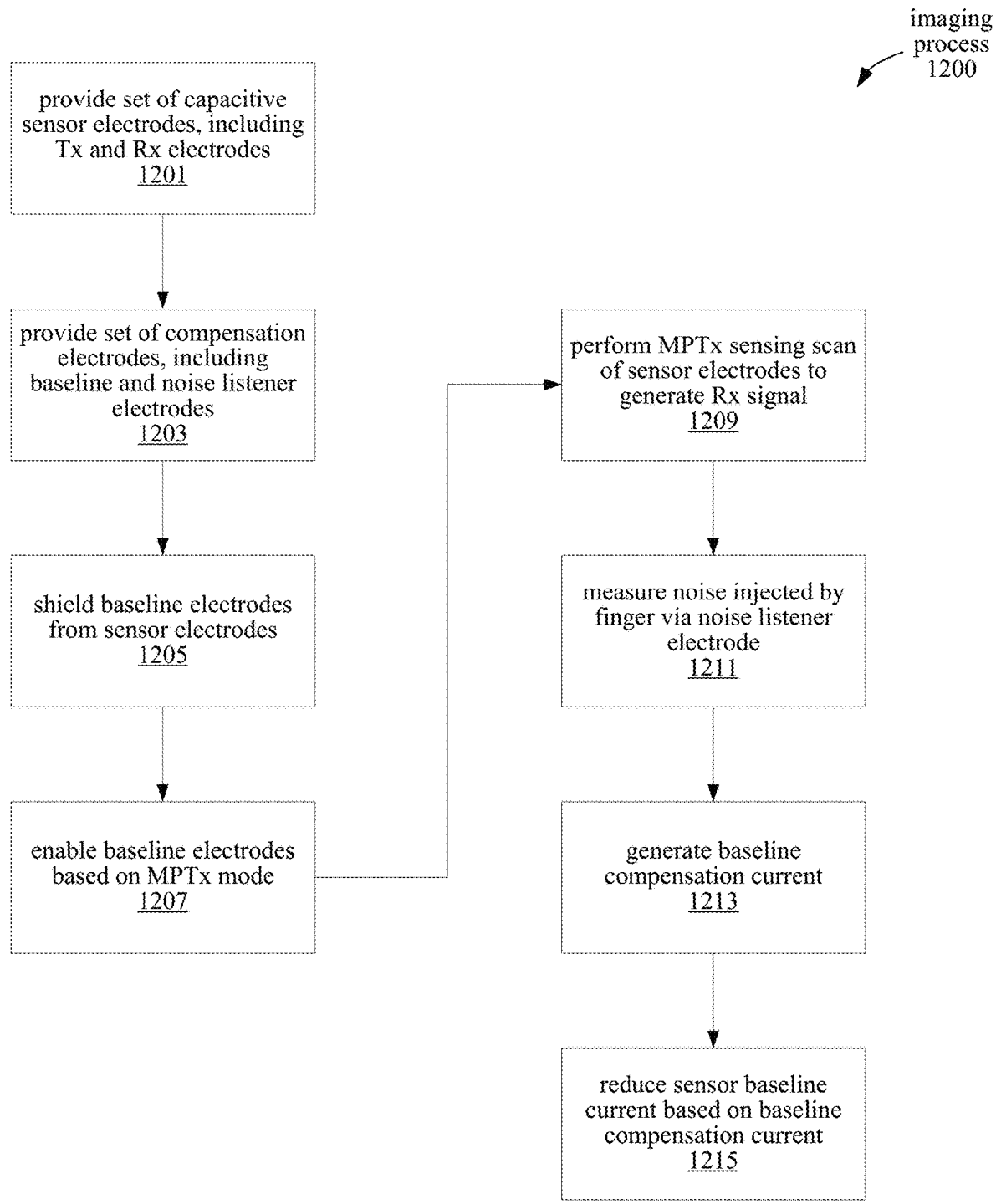
FIG. 12 illustrates a process for imaging a fingerprint, according to an embodiment.

FIG. 12 is a flow diagram illustrating a process 1200 for imaging a fingerprint contact at a sensing surface, according to an embodiment. In one embodiment, the fingerprint imaging process 1200 may be performed by a capacitive fingerprint sensing device, such as sensing device 300. The fingerprint imaging process 1200 begins at block 1201.

In accord with block 1201, the sensing device 300 provides a set of capacitive sensor electrodes in a sensing area, where the set of capacitive sensor electrodes includes a set of transmit (Tx) sensor electrodes and a set of receive (Rx) sensor electrodes. For example, the sensing device 300 provides a set of Tx sensor electrodes 301 and a set of Rx sensor electrodes 302, where each of the Tx sensor electrodes 301 intersects with each of the Rx sensor electrodes 302 in the sensing area 303.

In accord with block 1203, the sensing device 300 also provides a set of one or more compensation electrodes that are capacitively isolated from the sensing area. For example, the sensing device 300 provides a set of compensation electrodes, including Tx baseline electrodes 304 and Rx baseline electrodes 305. The set of compensation electrodes may also include one or more noise listener electrodes, such as Rx noise listener electrode 603, as illustrated in FIG. 6.

In accord with block 1205, the sensing device 300 electrically shields the set of baseline electrodes from the set of capacitive sensor electrodes using a grounded shield interposed between the set of capacitive sensor electrodes and the set of baseline electrodes. For example, the sensing device 300 may incorporate a ground shield similar to ground shield 607, as illustrated in FIG. 6, which is interposed between the sensor electrodes 601 and 602 and the baseline compensation electrodes TxBL and 605.

At block 1207, the sensing device 300 configures the Tx and Rx baseline electrodes to generate a baseline compensation current that matches a baseline current that will be generated by the MPTx mode that will be used for performing a sensing scan. In one embodiment, the multiple baseline electrodes are enabled or disabled via a switch operable to selectively connect the baseline electrode to a Tx driver (for Tx baseline electrodes) or to a LNA (for Rx baseline electrodes). Thus, the sensing device 300 may, for each of the baseline electrodes, operate the corresponding switch to selectively connect the baseline electrode to the multiphase capacitance sensor depending on the MPTx sensing mode to be used for performing the sensing scan. From block 1207, the process 1200 continues at block 1209.

At block 1209, the sensing device 300 performs an MPTx sensing scan of a set of capacitive sensor electrodes to generate an Rx signal at the set of Rx sensor electrodes. The sensing device 300 performs the MPTx sensing scan by applying a Tx signal with a first phase to a first subset of the set of Tx electrodes while simultaneously applying the Tx signal with a second phase (e.g, a phase opposite to the first phase) to a second subset of the set of Tx sensor electrodes.

At block 1211, the sensing device 300 measures noise received through a noise listener electrode contemporaneously with the sensing scan. For example, the sensing device 300 may measure the noise signal received by a noise listener electrode similar to electrode 603, as illustrated in FIG. 6, while performing a sensing scan of the capacitive sensor electrodes 301 and 302. Since such a noise listener electrode is located in the sensing area and has a surface area substantially equal to a surface area of one of the Rx sensor electrodes, the noise signal received by the noise listener electrode corresponds to the noise signal received at one of the Rx sensor electrodes. The sensing device 300 can then use the received noise signal to minimize or at least reduce the noise component of the Rx signal received from the Rx sensor electrodes. From block 1211, the process 1200 continues at block 1213.

At block 1213, the sensing device 300 generates a baseline compensation current. Depending on which of the Tx and Rx baseline electrodes are enabled, the sensing device 300 may generate the baseline compensation current by transmitting the Tx signal from each of one or multiple Tx baseline electrodes to a single Rx baseline electrode or to multiple Rx baseline electrodes that are capacitively coupled with the Tx baseline electrodes. The baseline compensation current is thus generated in the enabled Rx baseline electrodes and the Rx sensor electrodes due to capacitive coupling of these electrodes with the Tx baseline electrodes. From block 1213, the process 1200 continues at block 1215.

At block 1215, the sensing device 300 reduces the unwanted signal components of the Rx signal (i.e., the baseline current from the Rx sensor electrodes and the noise injected by the finger) based on the baseline and noise compensation signals received at the baseline compensation electrodes and the noise listener electrode, respectively. For example, with reference to FIG. 3, the charge from the Rx baseline electrodes 305 may be combined with the charge from the sensor electrodes 302 at the analog input of LNA 313. With reference to FIG. 7, the noise signal from noise listener electrode 603 may be measured with the full bridge measurement circuit 700 at the inputs of LNA 703. From block 1215, the process 1200 may continue back to block 1209 to perform another sensing scan.

In the foregoing embodiments, various modifications can be made; for example, row sensor electrodes and column sensor electrodes may be interchanged, and row or column sensor electrodes may be used as either Tx or Rx sensor electrodes. Furthermore, in some embodiments, intersections between row and column sensor electrodes may be replaced with conductive bridges. For example, bridges may be used to electrically connect portions of sensor electrodes when both row and column sensor electrodes are constructed from a single layer of conductive material. As described herein, conductive electrodes that are "electrically connected" or "electrically coupled" may be coupled such that a relatively low resistance conductive path exists between the conductive electrodes. Quantities or dimensions described as "substantially" equal may be nominally equal but need not be exactly equal (with variations due to manufacturing tolerances, environmental conditions, and/or other factors), or may be sufficiently close to equal for achieving an intended effect or benefit.

Embodiments described herein include various operations. These operations may be performed by hardware components, software, firmware, or a combination thereof. As used herein, the term "coupled to" may mean coupled directly or indirectly through one or more intervening components. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a computer-readable medium. These instructions may be used to program a general-purpose or special-purpose processor to perform the described operations. A computer-readable medium includes any mechanism for storing or transmitting information in a form (e.g., software, processing application) readable by a machine (e.g., a computer). The computer-readable storage medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory, or another type of medium suitable for storing electronic instructions.

Additionally, some embodiments may be practiced in distributed computing environments where the computer-readable medium is stored on and/or executed by more than one computer system. In addition, the information transferred between computer systems may either be pulled or pushed across the transmission medium connecting the computer systems.

Although the operations of the method(s) herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

In the foregoing specification, the claimed subject matter has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A fingerprint sensing device comprising:
a first plurality of unit cells formed within a sensing area, the first plurality of unit cells disposed such that a capacitance of each unit cell is alterable by a conductive object;
a second plurality of unit cells formed outside the sensing area, the second plurality of unit cells disposed such that a capacitance of each of the second plurality of unit cells is isolated from the conductive object;
a capacitance sensor circuit coupled to at least one electrode of each of the first and second pluralities of unit cells, the capacitance sensor for converting a first signal received on the at least one electrode of the first plurality of unit cells to a digital value representative of a capacitance of a first unit cell of the first plurality of unit cells, wherein a second signal received on the at least one electrode of the second plurality of unit cells modifies the first signal.

2. The fingerprint sensing device of claim 1, wherein the first plurality of unit cells are each formed at an intersection of a transmit (TX) electrode and a receive (RX) electrode.

3. The fingerprint sensing device of claim 1, wherein the second plurality of unit cells are each formed at an intersection of a transmit (TX) electrode and a receive (RX) electrode, and wherein the second plurality of unit cells is shielded from a proximity of a conductive object.

4. The fingerprint sensing device of claim 3, wherein the second plurality of unit cells shares at least one electrode with the first plurality of unit cells.

5. The fingerprint sensing device of claim 1, wherein the capacitance sensor circuits provides a first transmit (TX) signal to a first electrode of the first plurality of unit cells and a second TX signal to a second electrode of the first plurality of unit cells.

6. The fingerprint sensing device of claim 5, wherein the capacitance sensor circuit provides a third TX signal to a third electrode of the second plurality of unit cells.

7. The fingerprint sensing device of claim 6, wherein the third TX signal is in phase with the first TX signal.

8. The fingerprint sensing device of claim 1, wherein each of the second plurality of unit cells has a substantially different capacitance.

9. The fingerprint sensing device of claim 1, wherein the second plurality of unit cells are coupled to the capacitance sensor circuit simultaneously.

10. A method comprising:
receiving a first signal on a first receive fingerprint sensing electrode, the first signal representative of a mutual capacitance of a first unit cell comprising the first receive fingerprint sensing electrode;
receiving a second signal on a second receive fingerprint sensing electrode, the second signal representative of a mutual capacitance of second unit cell comprising the second receive fingerprint sensing electrode;
combining the first and second signals to create a combined signal, the combined signal representative of a mutual capacitance of the first unit cell without parasitic capacitance from the first receive fingerprint sensing electrode; and
converting the combined signal to a digital value,
wherein the second unit cell is formed outside a sensing area including the first unit cell, the first unit cell disposed such that the mutual capacitance of the first unit cell is alterable by a conductive object and the second unit cell disposed such that the mutual capacitance of the second unit cell is isolated from the conductive object.

11. The method of claim 10, further comprising
applying a first transmit signal to a first transmit fingerprint sensing electrode, the first transmit fingerprint sensing electrode forming a mutual capacitance with the first receive fingerprint sensing electrode; and
inducing a first current on the first receive fingerprint sensing electrode, wherein the first current is the received first signal on the first receive fingerprint sensing electrode.

12. The method of claim 10, further comprising
applying a second transmit signal to a second transmit fingerprint sensing electrode, the second transmit fingerprint sensing electrode forming a mutual capacitance with the second receive fingerprint sensing electrode; and
inducing a second current on the second receive fingerprint sensing electrode, wherein the second current is the received second signal on the second receive fingerprint sensing electrode.

13. The method of claim 12, wherein the first and second transmit fingerprint sensing electrodes are the same, and wherein the first and second transmit signals are the same signal.

14. The method of claim 11, further comprising:
receiving a third signal on a third receive fingerprint sensing electrode, the third signal representative of a mutual capacitance of a third unit cell comprising the third receive fingerprint sensing electrode, the third unit cell formed within the sensing area,
wherein a third transmit signal is applied to a third transmit fingerprint sensing electrode, the third transmit signal for inducing a third current on the third receive fingerprint sensing electrode, the third transmit signal being different from the first transmit signal.

15. A fingerprint imaging device comprising:
a sensing array comprising:
a first plurality of unit cells formed within a sensing area, the first plurality of unit cells disposed such that a capacitance of each unit cell is alterable by a conductive object;
a second plurality of unit cells formed outside the sensing area, the second plurality of unit cells disposed such that a capacitance of each of the second plurality of unit cells is isolated from the conductive object;
a capacitance measurement circuit coupled to at least one electrode of each of the first and second pluralities of unit cells, the capacitance measurement circuit for converting a first signal received on the at least one electrode of a first unit cell of the first plurality of unit cells to a digital value representative of a capacitance of the first unit cell, wherein a second signal received on the at least one electrode of the second plurality of unit cells modifies the first signal; and
a processor for evaluating the digital value and constructing an image of a fingerprint therefrom.

16. The fingerprint imaging device of claim 15, wherein the first plurality of unit cells are each formed at an intersection of a transmit (TX) electrode and a receive (RX) electrode.

17. The fingerprint imaging device of claim 15, wherein the second plurality of unit cells are each formed at an intersection of a transmit (TX) electrode and a receive (RX)

electrode, and wherein the second plurality of unit cells is shielded from a proximity of a fingerprint feature.

18. The fingerprint imaging device of claim 17, wherein the second plurality of unit cells shares at least one electrode with the first plurality of unit cells.

19. The fingerprint imaging device of claim 15, wherein each of the second plurality of unit cells has a substantially different capacitance.

20. The fingerprint imaging device of claim 15, wherein the second plurality of unit cells are coupled to the capacitance measurement circuit simultaneously.

\* \* \* \* \*